(12) United States Patent
McPartland et al.

(10) Patent No.: US 6,191,963 B1
(45) Date of Patent: Feb. 20, 2001

(54) CHARGE PUMP WITH NO DIODE DROP AT OUTPUT STAGE

(75) Inventors: Richard Joseph McPartland, Nazareth; Amit Kumar Banerjee, Emmaus; Duane J. Loeper, Spring City, all of PA (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/488,069

(22) Filed: Jan. 19, 2000

(51) Int. Cl.[7] ...................................................... H02M 3/18
(52) U.S. Cl. ............................ 363/60; 307/111; 307/390; 307/536
(58) Field of Search ....................... 363/59, 60; 327/536, 327/111, 390

(56) References Cited

U.S. PATENT DOCUMENTS

| | | |
|---|---|---|
| 5,303,138 | 4/1994 | Rozman . |
| 5,528,482 | 6/1996 | Rozman . |
| 5,907,484 | 5/1999 | Kowshik et al. . |
| 5,912,560 | 6/1999 | Pasternak . |
| 5,982,223 * | 11/1999 | Park et al. ............................... 363/60 |
| 6,075,402 * | 6/2000 | Ghilardelli et al. .................... 363/60 |

OTHER PUBLICATIONS

Jieh–Tsorng Wu, et al., "MOS Charge Pumps for Low–Voltage Operation," IEEE Journal of Solid–State Circuits, vol. 33, No. 4, Apr. 1998, pp. 592–597.

* cited by examiner

*Primary Examiner*—Peter S. Wong
*Assistant Examiner*—Gary L. Laxton
(74) *Attorney, Agent, or Firm*—Duane, Morris & Heckscher LLP

(57) ABSTRACT

An integrated circuit-based charge pump generates an output voltage having a greater magnitude than a power supply voltage. The charge pump has a charge pump section having a plurality of alternating stages driven by first and second alternating, non-overlapping clock signals, said plurality of alternating stages including an input stage for receiving the power supply voltage and an output stage for generating at a last stage node a last stage voltage having a greater magnitude than the power supply voltage. A gating transistor is coupled at a drain terminal to the last stage node, wherein the gating transistor is clocked by one of said clock signals and is biased so that the gating transistor, during a boost phase, gates the last stage voltage to a load coupled to the source terminal of the gating transistor without a voltage drop and, at other times, turns off to prevent charge from flowing from the load into the last stage node of the charge pump section.

9 Claims, 3 Drawing Sheets

100

200

300

400

CHARGE PUMP WITH NO DIODE DROP AT OUTPUT STAGE

BACKGROUND OF THE INVENTION

1. Field of the Invention

The present invention relates to charge pumps used to generate voltage having a greater magnitude than the positive and negative power supply rails, and, in particular, to positive charge pumps that generate an output voltage higher than the power supply and to negative charge pumps that generate an output voltage lower than ground or the negative supply voltage.

2. Description of the Related Art

It is useful to be able to generate a voltage greater in magnitude than the maximum supply voltages available in a given circuit or system. Charge pumps are often used for this purpose, to convert a low magnitude voltage to a higher magnitude voltage (whether negative or positive). For example, charge pumps are employed in various types of circuits, such as integrated circuits (ICs), to generate an output voltage higher than the power supply (e.g., $V_{DD}$) or lower than ground or the negative supply voltage (e.g., $V_{SS}$). These are known as positive and negative charge pumps, respectively. Both types of charge pumps generate an output voltage having a greater magnitude than the magnitude of either the positive or negative power supply voltages ($V_{DD}$ and $V_{SS}$ or ground).

Charge pumps typically operate by using a chain of switches to transfer cumulatively increasing charges from one capacitively boosted node to the next. These switches typically comprise a series of clocked diode-capacitor voltage multiplier circuits. By using such charge-coupling techniques, the voltage is lowered (for a negative charge pump) or raised (for a positive charge pump) in incremental steps from one stage to the next. Thus, at each stage, the cumulative voltage increases in magnitude, until a final stage, at which point the output voltage is to be applied to a given load.

After the final stage of the charge pump, a diode switch is typically used to transfer the cumulated charge to the load. The diode switch also prevents charge from feeding back from the load into the charge pump, which would otherwise reduce the pumping action and thus reduce the magnitude of the charge pump's output voltage applied to the load. Unfortunately, however, due to the forward diode voltage (up to 3V, depending upon the design) drop across the diode, the magnitude of the ultimate charge pump output voltage applied to the load is less than the last stage voltage at the input of the diode switch.

This can reduce the efficacy of the charge pump. For example, one technique for erasing Flash EEPROM memory cells involves applying or "steering" a negative erasure voltage to all of the rows of the memory array. This negative erasure voltage must be isolated from the rows at other times so that the memory cells are not continually erased. However, when using a typical conventional charge pump for such Flash EEPROM erasure purposes, the magnitude of the negative voltage reaching each row is reduced by one p-channel threshold (about 1V), due to the use of the diode switch coupled to the last internal stage or node of the charge pump.

One prior art charge pump is the positive charge pump circuit described in Jieh-Tsorng Wu & Kuen-Long Chang, "MOS Charge Pumps for Low-Voltage Operation," *IEEE J. Solid-State Circuits*, vol. 33, no. 4 (April 1998), pp. 592–597, the entirety of which is incorporated herein by reference. Other prior art charge pumps are disclosed in U.S. Pat. No. 5,907,484, issued to Kowshik et al., and in U.S. Pat. No. 5,912,560, issued to Pasternak. The Wu & Chang positive charge pump is represented by charge pump circuit 100 of FIG. 1. Prior art charge pump 100 is based on a four-stage Dickson charge pump, which uses a two-phase nonoverlapping clock (PHI1 and complementary clock PHI2), and a series of MOS capacitor switches and capacitors to couple subsequent nodes or stages to higher and higher cumulative voltages. Charge pump 100 comprises four stages, each coupled at an output node to one of four nodes N1, N2, N3, N4. The input of the first stage is coupled to input voltage, i.e. $V_{DD}$. The output at each succeeding stage, e.g. voltage $V_1$ at node N1, is cumulatively higher, when charge is gated or pumped through the chain of stages, by the operation of clock signals PHI1, PHI2, applied to stages via coupling or boost capacitors MC1, MC2, MC3, MC4. Illustrative clock phases for clock signals PHI1, PHI2, are shown in FIG. 2.

Each stage of the charge pump has a diode-connected MOS transistor MDi, so that the charges can be pushed in only one direction. The two pumping clocks PHI1, PHI2 are out of phase and have a voltage amplitude of $V_{PHI}$, which is usually identical to the supply voltage $V_{DD}$. Through the coupling or boost capacitors MC1, MC2, MC3, MC4, the two clock signals push the charge voltage upward through the transistors.

The internal most positively charged pump node, N4, has the charge pump voltage $V_C$, which needs to be gated to the load (load resistance $R_L$ in parallel with load capacitance $C_L$). The output node OUT, at output voltage $V_O$, is coupled to node N4 by a diode-switch MS5, which is a MOS transistor connected in a diode configuration, i.e. with its gate G connected to its drain D. This allows positive charge to flow out of the charge pump and into the load, but prevents positive charge from flowing back into the pump when node N4 is coupled low, through capacitor MC4, by clock PHI2 being driven low. The output voltage $V_O$ of a charge pump circuit is a function of the input power supply, the number of pump stages, the clock frequency, and the load current at the output terminal.

A disadvantage resulting from use of diode switch MS5 is that the maximum theoretical output voltage OUT is one high back-gate biased n-channel threshold (Vt, e.g. 2V) below the voltage of N4, when it has just been coupled high via capacitor MC4 driven by clock PHI2 going high. Thus, because of the threshold voltage drop across diode switch MS5, the actual output voltage $V_O$ is less than $V_O$ e.g. by about 2V. As is well known, threshold voltage increases with increasing source to back-gate bias, $V_{sb}$. Thus if the back-gate connection of MS5 is at ground, a typical condition, the threshold voltage of MS5 increases significantly as the charge pump's output, which is the source voltage on MS5, is pumped high. For example, if MS5 had a threshold voltage of 0.7 volts when $V_{sb}$ is 0 volts, then typically the threshold voltage might increase to 2 volts when to charge pump's output, and therefore $V_{sb}$ is pumped up to 8 volts.

The positive charge pump described in the Wu & Chang reference can be reconfigured as a negative charge pump by replacing the n-channel devices thereof with p-channel devices, inverting the clocks PHI1 and PHI2, and changing the power input from $V_{DD}$ to ground. In such a negative charge pump, the output voltage again has a smaller (negative) magnitude than at the preceding stage N4, due to the voltage drop across the diode switch. Accordingly, there is a need for improved charge pumps.

SUMMARY

An integrated circuit-based charge pump generates an output voltage having a greater magnitude than a power supply voltage. The charge pump has a charge pump section having a plurality of alternating stages driven by first and second alternating, non-overlapping clock signals, said plurality of alternating stages including an input stage for receiving the power supply voltage and an output stage for generating at a last stage node a last stage voltage having a greater magnitude than the power supply voltage. A gating transistor is coupled at a drain terminal to the last stage node, wherein the gating transistor is clocked by one of said clock signals and is biased so that the gating transistor, during a boost phase, gates the last stage voltage to a load coupled to the source terminal of the gating transistor without a voltage drop and, at other times, turns off to prevent charge from flowing from the load into the last stage node of the charge pump section.

DESCRIPTION OF THE PREFERRED EMBODIMENT

As noted above, use of a conventional diode switch between the last stage of the charge pump and the load prevents charge from feeding back from the load into the charge pump, but at the cost of reducing the charge pump output voltage by the forward diode voltage of the diode switch. In the present invention, a gating transistor that does not have a voltage drop is used as a gating switch instead of using a diode switch. This thus increases the output voltage for a given charge pump. The gating transistor is biased and clocked so that it gates the charge pump voltage $V_C$ to the output terminal and the load without a voltage drop but while still preventing the charge feedback that is also prevented by prior art diode switch charge pumps.

As noted above, a charge pump may be used to boost (or attenuate) a given input voltage to provide a new output voltage. In general, whether the charge pump is a negative or positive charge pump, the charge pump generates an output voltage having a larger magnitude than the input voltage. This generated charge pump output voltage may be used, for example, to erase the memory cells of a Flash EEPROM memory by applying an appropriate voltage to a floating-gate device. Because the charge pump of the present invention does not suffer a diode drop at the output stage, the full cumulated negative voltage is applied to the rows of a memory cell to be erased. This enhances erasure, for a given charge pump configuration and number of stages, or permits a charge pump with fewer stages to provide the same ultimate output voltage as a conventional charge pump.

Figure 1:
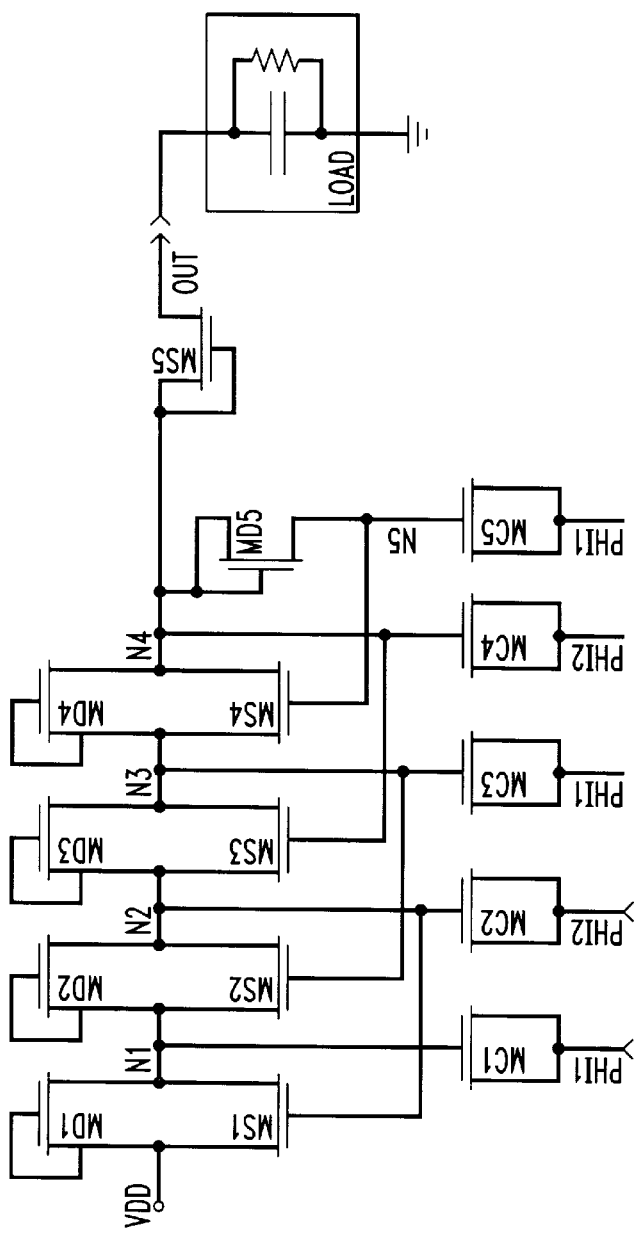
FIG. 1 is a circuit diagram illustrating a prior art charge pump.
Figure 2:
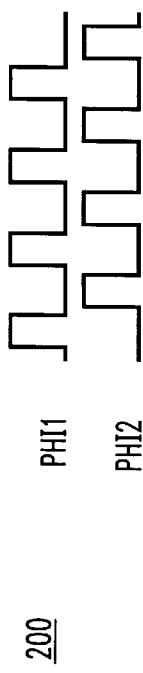
FIG. 2 is a timing diagram of clock signals used to control a charge pump.
Figure 3:
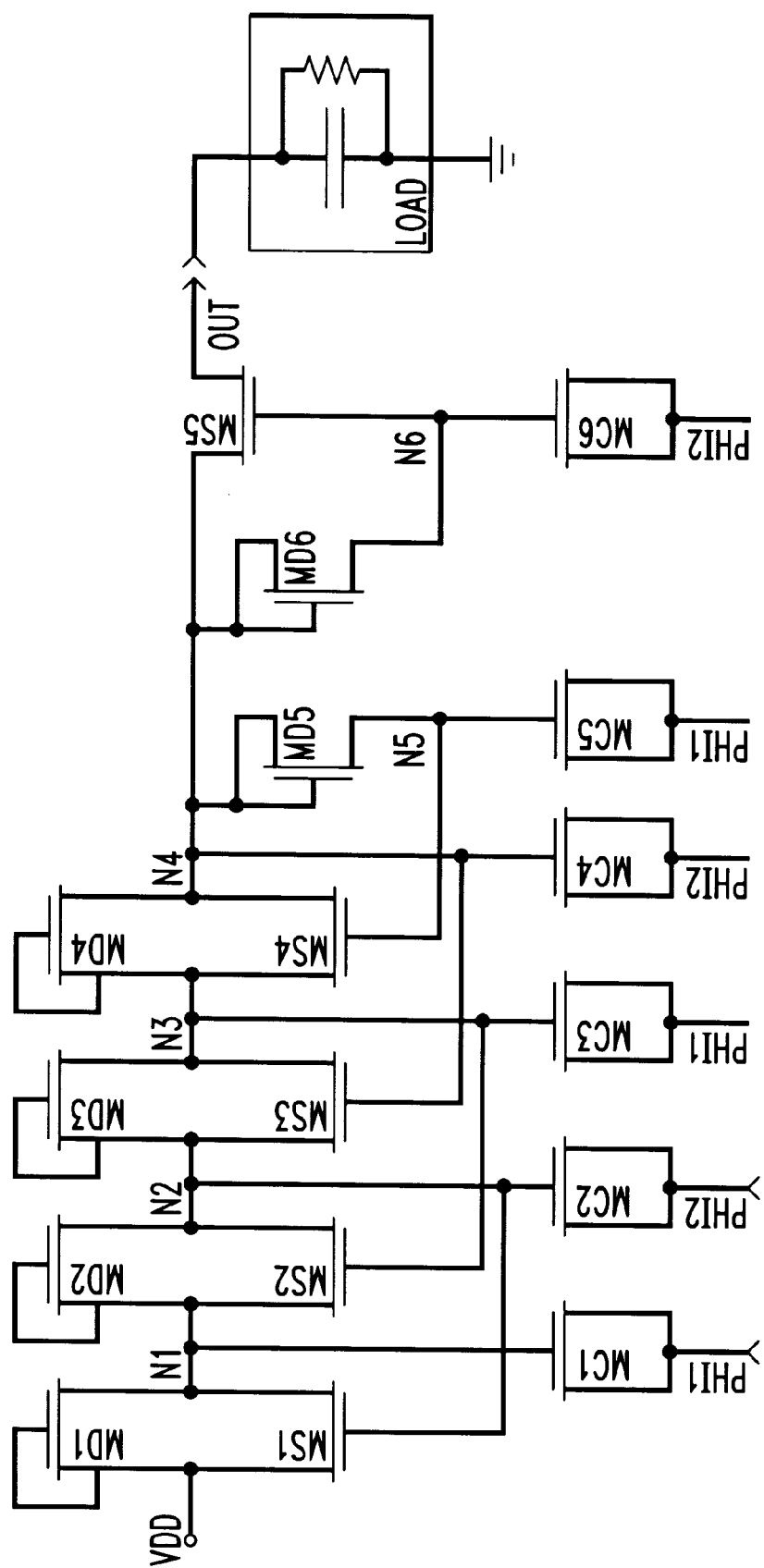
FIG. 3 is a circuit diagram illustrating a charge pump having a gating transistor, in accordance with an embodiment of the present invention.
Figure 4:
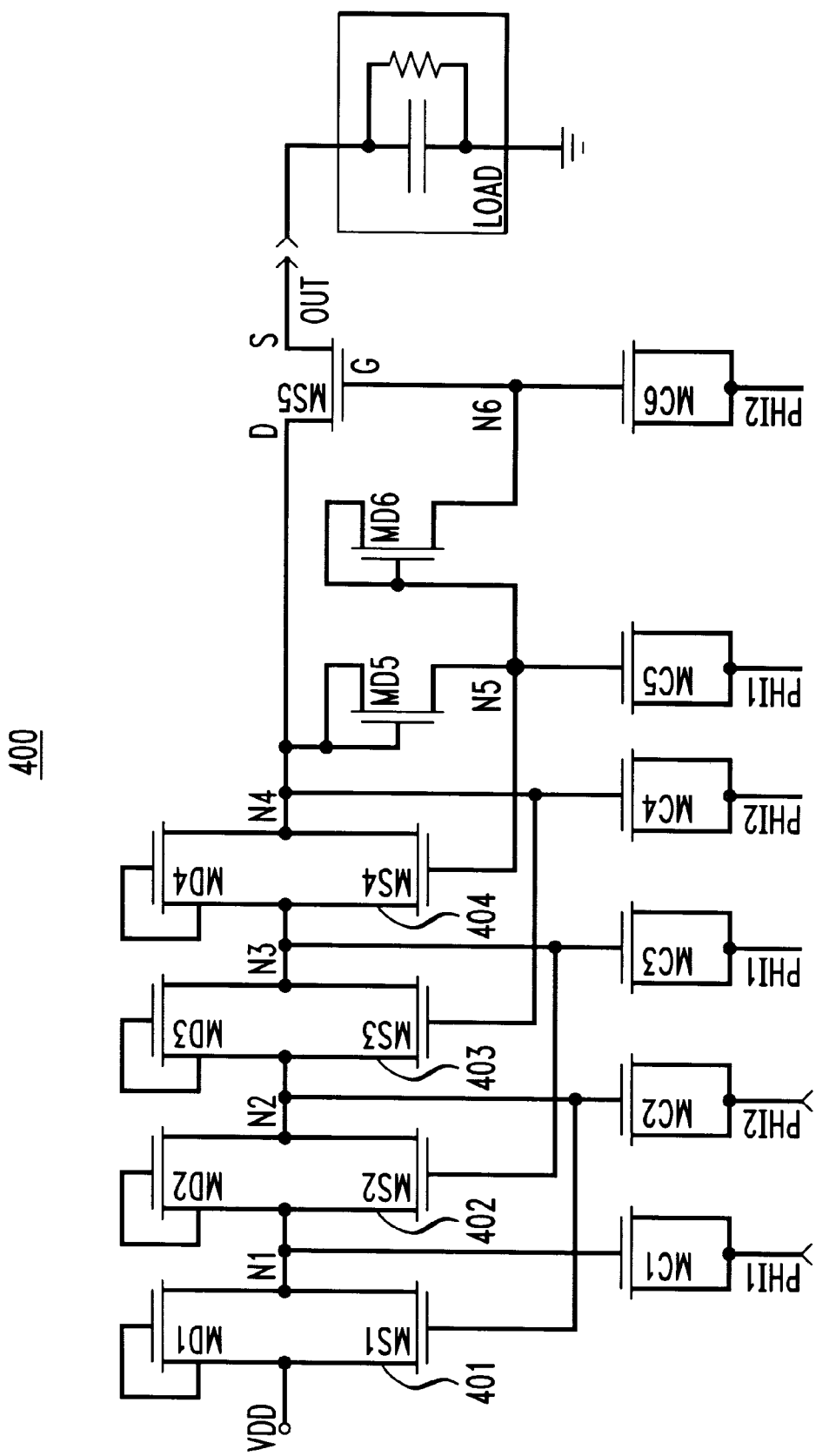
FIG. 4 is a circuit diagram illustrating another embodiment of a charge pump having a gating transistor, in accordance with an embodiment of the present invention.

Referring now to FIGS. 3 and 4, there are shown improved charge pumps 300 and 400, in accordance with embodiments of the present invention. Charge pumps 300 and 400 are similar to the Wu & Chang type charge pump 100 illustrated in FIG. 1, except that, instead of diode switch MS5 of circuit 100, circuits 300 and 400 employ an n-channel MOS gating transistor MS5, a biasing diode (diode-connected transistor MD6), and capacitor MC6, interconnected and coupled to clock signal PHI2 as shown. Each n-channel transistor of charge pumps 300 and 400, e.g. MS5, has a back-gate connection at ground. The clock signals PHI1, PHI2, illustrated in timing diagram 200 of FIG. 2, may be used to control charge pumps 300 and 400. These clock signals alternate and are non-overlapping, so that PHI1 is on during part of the off period of PHI2, and vice-versa.

As noted above, biasing diode MD6 and capacitor MC6, along with the coupling to clock signal PHI2, bias and control the gating transistor MS5 so that it gates the charge pump voltage $V_C$ to the output terminal (as voltage $V_O$) and to the load without a voltage drop across the gating transistor, while still preventing charge feedback.

During steady-state operation, the alternating, non-overlapping pair of inverted clock signals PHI1, PHI2 cause charge and thus voltage to be gradually incremented from node N1 to node N4. Charge pumps 300 and 400 have four stages, where each stage i has a transistor MSi, diode-connected transistor MDi, and capacitor MCi. The diode MDi and transistor MSi of a given stage form a switch; e.g., stage 1 has switch 301, which comprises MS1 and MD1. Each stage receives an input charge or voltage and provides an output cumulated charge or voltage at its output to a node Ni. The transistors MSi of the stages receive alternating clock signals PHI1, PHI2, through capacitor $MC_{i+1}$, and each node Ni is coupled to the clock signal PHI1 or PHI2 from capacitor MCi.

Thus, for example, the first stage receives $V_{DD}$ as an input voltage, and provides a higher average voltage or charge at its output node N1, which is in turn the input to the next stage 2. Transistor MS1 receives PHI2 from capacitor MC2, while node N1 is coupled to PHI1 through MC1. Transistor MS1 and diode MD1 serve as a switch to couple the input $V_{DD}$ voltage source to node N1 and "boost" capacitor MC1. Thus, each boost capacitor MCi is coupled between an input voltage and a clock voltage source (PHI1 or PHI2, the complementary (non-overlapping) signal of the PHI1 signal). The gating transistor (or, in prior art circuit 100, the diode switch) between node N4 and the load selectively couples the load in parallel to the last boost capacitor MC4. Thus, the switches 301, 302, 303, 304 operate alternatively, in accordance with the state of the clock signals PHI1, PHI2.

Each stage operates in two phases: pre-charge and boost. Pre-charge occurs when the associated clock voltage of a boost capacitor (e.g., MC2) is low, the following charge transfer switch (e.g. 303) is open, and the input charge transfer switch (e.g. 302) is closed. This causes charge to be transferred from the preceding voltage source (e.g. node N1) to the boost capacitor.

In a boost phase, the associated clock voltage of a boost capacitor (e.g., MC2) is high, the charge transfer switch at its output (e.g. 303) is closed, and the input charge transfer switch between the capacitor and the previous stage (e.g. 302) is open. During a boost phase for a given stage, the stage's charge is transferred to the next stage (which is thus in pre-charge phase). In a given boost phase, the clock signal is applied to one side of a given boost capacitor, when the capacitor already has a charge stored thereon.

Thus, when the clock signal goes high, this forces charge stored in the capacitor to be transferred to the next boost capacitor. As the cycle repeats, more charge is transferred from one boost capacitor to another. However, because the capacitance of each boost capacitor MCi is fixed, increasing the total charge stored therein requires a corresponding voltage increase across the next boost capacitor (or load, for boost capacitor MC4). The maximum voltage that can be achieved for a given stage is the input voltage to the stage (e.g., $V_{DD}$ applied to stage 1) boosted by the clock voltage swing, typically the supply voltage $V_{DD}$. Thus, for n boost capacitors MCi (for n stages, e.g. n=4), the maximum voltage at the last stage ($V_C$) is $n \cdot V_{DD}$. Note that, in the prior art charge pump 100, because of the voltage drop across the diode-configured transistor MS5, the actual maximum voltage $V_{Cmax}=(n \cdot V_{DD})-V_T$, where $V_T$ is the threshold drop of MD5.

Thus, during steady-state operation, where, for example, $V_{DD}$=5V, a steady-state is reached in which the output voltage $V_O$ is a wave (e.g., square wave or some other shape depending on the size of load capacitor $C_L$) of the same frequency as the PHI1, PHI2 clock signals, riding atop a DC component, and having an average value greater than $V_{DD}$, e.g. 10V.

In the present invention, gating transistor MS5 is used to gate $V_C$ to node OUT and across the load, without any voltage drop, so that $V_O=V_C$ while still preventing charge feedback, as follows. As will be appreciated, the source terminal S of n-channel MOS gating transistor MS5 can only be raised to one threshold voltage $V_t$ below the voltage of its gate terminal G ($V_6$).

Referring once more to charge pump 300 of FIG. 3, for MS5 to pass the full voltage $V_C$ to the charge pump output, $V_O$, the gate of MS5 (node N6) must be one threshold voltage above the drain of MS5 (node N4). This is accomplished in two phases; a pre-charge phase and a boost phase. In the pre-charge phase of MS5, clock PHI1 is high, pre-charging node N4 to $V_{Cprech}$ via MS4, and clock PHI2 is low. During this phase, biasing diode MD6 pre-charges node N6 to $V_{6prech}=V_{Cprech}-V_t$ where Vt is the threshold voltage of MD6. During the subsequent boost phase, PHI2 goes high boosting node N6 to $V_{6boost}$, via boost capacitor MC6, as well as boosting N4 to its high boosted level, $V_{cboost}$, via boost capacitor MC4. By making the boosting capacitance of MC6 large with respect to the capacitance of node N6, virtually the entire voltage swing of PHI2, typically $V_{DD}$, is transferred to node N6. Thus the voltage on N6 during the boost phase is $V_{6boost}=V_{Cprech}-V_t+V_{DD}$.

As stated above, in order for the entire boosted node N4 voltage to be passed through MS5, the gate of MS5, node N6, must be boosted to a threshold voltage above node N4. That is, $V_{6boost}>V_{Cboost}+V_t$. From above, $V_{6boost}=V_{Cprech}-V_t+V_{DD}$. Therefore, $V_{Cprech}-V_t+V_{DD}>V_{Cboost}+V_t$, or rearranging, $V_t<V_{DD}/2-(V_{Cboost}-V_{Cprech})/2$. The condition for transferring the entire boosted voltage on node 4, $V_{Cboost}$, to the charge pump output is:

$$V_t<V_{DD}/2-(V_{Cboost}-V_{Cprech})/2 \quad (1)$$

An alternative configuration of the invention is charge pump 400, shown in FIG. 4. Charge pump 400 has a configuration similar to that of charge pump 300, except that in charge pump 400 the gate and drain of MD6 are connected to node N5 instead of node N6. The operation differs from that of charge pump 300 in that during the pre-charge phase of MS5, node N6 is pre-charged to a threshold below the voltage on node N5. As before, clock PHI1 is high during this phase, so node N5 is at its high boosted voltage which will be almost $V_{DD}$ above a threshold below node N4 when it was boosted, i.e. $V_5=V_{Cboost}-V_t+V_{DD}$. Thus during the precharge phase of MS5, $V_{6prech}=V_5-V_t=V_{Cboost}-2V_t+V_{DD}$. As before, during the boost phase of MS5, node N6 will be boosted by almost $V_{DD}$. Thus during the boost phase of MS5 and node N4, when PHI2 is high, $V_{6boost}=V_{6prech}+V_{DD}=V_{Cboost}-2V_t+2V_{DD}$.

As in charge pump 300, in order for the entire boosted node N4 voltage to be passed through MS5, the gate of MS5, node N6, must be boosted to a threshold voltage above node N4. That is, $V_{6boost}>V_{Cboost}+V_t$. From above, $V_{6boost}=V_{Cboost}-2V_t+2V_{DD}$. Therefore, $V_{Cboost}-2V_t+2V_{DD}>V_{Cboost}+V_t$, or rearranging, $V_t<2V_{DD}/3$. The condition for transferring the entire boosted voltage on node 4, $V_{Cboost}$, to the charge pump output is:

$$V_t<2V_{DD}/3 \quad (2)$$

For both charge pumps 300 and 400, the thresholds of devices MS5 and MD6 are nearly equal and increase as the charge pump's output voltage, $V_O$, increases. This threshold increase with increasing back-gate to source voltage is the well-known back-gate bias or body effect. Charge pump 400 is superior to charge pump 300 in that $V_t$ can increase to a larger voltage, than it can in charge pump 300, and still pass full $V_C$. Both charge pumps are superior to prior art charge pump 100, which always passes one threshold lower than $V_C$.

For example, if $V_{DD}$ is 5 volts and $V_{Cboost}$ is boosted to 10 volts, prior art charge pump 100 may typically have a peak output voltage, $V_O$, of 8 volts ($V_t$ of MS5 is 2 volts with a backgate to source potential of 8 volts). In this example, charge pump 400 would have a peak output voltage of the full 10 volts because the threshold is less than 3.3 volts ($2V_{DD}/3$).

The peak output voltage of charge pump 300 depends upon the magnitude of the ripple oscillation on node N4 in response to clock PHI1. Consider two extremes. One extreme is for a load that only has capacitance, in which case, once the load is fully charged so that no current is flowing into the load, node N4 reaches a steady state where the oscillations on node N4 approach zero magnitude and $V_{Cprech}$ approaches $V_{Cboost}$. The other extreme is for a load that has a resistive component so that current always flows into the load, even after the pump reaches steady state. If load current is relatively large, the steady state oscillations on node N4 ($V_{Cboost}-V_{Cprech}$) could approach $V_{DD}$ in magnitude. For the capacitive load only Eq. 1 becomes Eq. 3 below:

$$V_t<V_{DD}/2 \quad (3)$$

For a capacitance only load, the peak output voltage for charge pump 300, corresponding to the charge pump 100 example above, is 10 volts because the threshold is less than 2.5 volts ($V_{DD}/2$).

For a resistive load with relatively large load current, Eq. 1 becomes Equation 4 below:

$$V_t<0 \quad (4)$$

In this case, the example peak output voltages for charge pump 300 is 6 volts, that is two thresholds below $V_{Cboost}$. In this example, solving Eq. 1 for $V_t$=2 volts indicates that when the ripple on node N4, $V_{Cboost}-V_{Cprech}$, is less than 1 volt, the pump's output is 10 volts. Also in this example, pump 300's output is greater than pump 100's output (8 volts) when the ripple on node N4 is less than 3 volts.

Typically charge pumps are not run with full $V_{DD}$ ripple on node N4. Charge pump 300 is, therefore, better suited for capacitance loads without substantial current draw. Charge pump 400's advantage over charge pump 300 is also noticeable at lower $V_{DD}$ potentials, even with loads that are only capacitive. For example, if $V_{DD}$ is 3 volts and $V_{Cboost}$ is boosted to 10 volts, charge pump 300's output voltage would be limited to one threshold drop (2 volts) below $V_6$. That is, $V_{Cprech}-2V_t+V_{DD}=V_{Cprech}-4+3=V_{Cprech}-1$ volt. Thus its output voltage would between 6 and 9 volts, depending on load current. Under the same conditions, charge pump 400 would have a full 10 volts output. Its output would be limited to one threshold drop (2 volts) below $V_6$. That is, $V_{Cboost}-3V_t+2V_{DD}=V_{Cboost}-6+6=V_{Cboost}$.

For both charge pumps 300 and 400, when PHI2 goes low after the boost phase, N6 is reduced by almost $V_{DD}$. Thus N6 goes below a threshold (Vt) above OUT, and gating transistor MS5 is turned off, thereby preventing the back flow of positive charge through MS5. This depends upon proper sizing of components. Thus, due to coupling to PHI2 through capacitor MC6, gating transistor MS5 is on only when charge from node N4 is to be transferred to the load, but $V_G$ is ideally at least one threshold higher than N4 at this point so that there is no voltage drop from drain-to-source. Gating transistor MS5 is off when node N4 is being precharged again by preceding stage 3, thereby providing the gating and feedback-prevention function of prior art diode switch MS5 of circuit 100, but without the diode drop Vt across MS5 when it is turned on. Thus, during the charge transfer time, $V_O$ is equal to $V_C$, instead of being less than $V_C$.

In particular, the gate of output or gating transistor MS5 is driven high by clock PHI2 going high. Clock PHI2 is coupled to the gate through DC isolation capacitor MC6. The MOS diode-configured transistor MD6 initially sets the gate of transistor MS5 at one threshold (Vt) below the voltage at node N4 for charge pump 300 or one threshold below N5 for charge pump 400. From this voltage level, the rising clock PHI2 boosts the gate of MS5 at least one threshold above the voltage $V_C$ at node N4. This allows the full voltage level of $V_C$ to pass through gating transistor $MS_5$ to the output node OUT. Thus, the maximum theoretical output voltage $V_O$ is equal to charge pump voltage $V_C$, which is one threshold voltage Vt higher than provided in prior art charge pump 100.

In charge pumps 300 and 400, configured to provide a positive pump output $V_C$ above $V_{DD}$, a typical (high back-gate bias) value of $V_t$ is about 2V. Therefore, the charge pump of the present invention has a maximum output voltage $V_O$ about 2V higher than that possible with prior art charge pump 100. As will be appreciated, the actual improvement in output voltage $V_O$ depends upon the resistive/capacitive characteristics ($R_L$, $C_L$) of the load, the values of the boosting capacitors, MCi, and the driving power ($V_{DD}$) of the charge pump.

Charge pumps 300 and 400 are, in one embodiment, implemented as an integrated circuit (IC). ICs are typically formed in a manufacturing process by forming chips or dies containing the ICs in the silicon substrate of physical wafers. Typically, several chips are formed in each wafer, each chip corresponding to or containing one IC. A wafer is a very thin, flat disc typically about 8"–12" in diameter. The manufacturing process consists of operations on the surface and substrate of the wafer to create a number of (typically identical) chips. Once the wafer is completely processed, it is cut up into the individual chips, which are typically are up to 1.5 cm by 1.5 cm in size.

A negative charge pump in accordance with the present invention may be provided by reconfiguring positive charge pumps 300 or 400, as will be appreciated, in particular, by replacing the n-channel devices thereof with p-channel devices, inverting the clocks PHI1 and PHI2, and changing the power input from $V_{DD}$ to ground. Such a negative charge pump is able to pump or provide an output load voltage that is one p-channel threshold (e.g., about –2V) lower than would be available in a conventional negative charge pump.

As will be appreciated, a computer memory cell of memory arrays stores a bit of data, i.e. a logic-0 or logic-1, sometimes referred to as low or high, respectively, corresponding to the low voltage state (typically $V_{SS}$, e.g. ground=0V)) or the high voltage state (typically $V_{DD}$, e.g. 3V). New data (i.e., a bit) may be written into the cell, and stored data (i.e., a bit) may be read from the cell. The data stored in a cell is typically read from the cell via an output terminal of the memory cell. An array of memory cells are typically provided in a memory array architecture, divided into rows and columns. The memory cell array typically provides storage of larger, multi-bit units of data such as bytes or words. Each row of the array usually contains at least one, and typically several, words. Each column of the array typically contains a single column output line which is coupled to every output terminal of the memory cells in that column. Memory arrays can be implemented in various forms, including FLASH EEPROM, DRAM, ROM, and SRAM. Memory arrays are increasingly used in ICs in devices such as cellular telephones, answering machines, cordless phones, and other applications.

In an embodiment, the charge pump of the present invention may be a negative charge pump used to steer a negative voltage for erasing a FLASH EEPROM memory array. In an alternative embodiment, positive charge pumps 300 and 400 may be used to program or erase memory arrays requiring a positive voltage for this function. The charge pump of the present invention may also be used in other charge pump applications, and, in general, in any circuit, device, or system requiring the generation of voltages above the positive power supply or below ground (or $V_{SS}$). For example, charge pumps 300, 400 or a negative charge pump consistent with the principles thereof may be used in low-supply-voltage switched-capacitor systems that require high voltage to drive the analog switches.

In alternative embodiments, a charge pump in accordance with the principles of the present invention may comprises less than or greater than four charge pump stages or nodes.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. An integrated circuit having a charge pump for generating an output voltage having a greater magnitude than a power supply voltage, the charge pump comprising:

(a) a charge pump section having a plurality of alternating boosting stages driven by first and second alternating, non-overlapping clock signals, said plurality of alternating boosting stages including an input boosting stage for receiving the power supply voltage and a last boosting stage for generating at an output node of the last boosting stage a last stage voltage having a greater magnitude than the power supply voltage;

(b) a gating transistor coupled at its drain terminal to the output node of the last boosting stage, wherein the gating transistor is clocked by one of said clock signals and is biased so that the gating transistor, during a boost phase, gates the last stage voltage to a load coupled to the source terminal of the gating transistor without a voltage drop and, at other times, turns off to prevent charge from flowing from the load into the output node of the last boosting stage of the charge pump section, and (c) a biasing diode coupled to the gate terminal of the gating transistor for raising the magnitude of the voltage of the gate terminal of the gating transistor, during a precharge phase preceding the boost phase, to at least one threshold voltage less than the magnitude of the voltage of the drain terminal of the gating transistor.

2. The integrated circuit of claim 1, further comprising:

(d) a capacitor coupled between a gate terminal of the gating transistor and said one of said clock signals.

3. The integrated circuit of claim 1, wherein the biasing diode comprises a diode-connected transistor coupled at its source terminal to the gate terminal of the gating transistor and at its gate and drain terminals to the junction of the drain terminal of the gating diode and the output node of the last boosting stage.

4. The integrated circuit of claim 1, wherein the biasing diode comprises a diode-connected transistor coupled at its source terminal to the gate terminal of the gating transistor and at its gate and drain terminals to the source terminal of a last stage diode-connected transistor, wherein the last stage diode-connected transistor is connected through a last stage capacitor to the other clock signal and at its gate and drain terminals to the junction of the drain terminal of the gating diode and the output node of the last boosting stage.

5. The integrated circuit of claim 1, wherein: the charge pump is a positive charge pump, the power supply voltage is a positive power supply voltage, the output voltage is a positive output voltage having a greater magnitude than the positive power supply voltage, and the gating transistor is an n-channel MOS gating transistor.

6. The integrated circuit of claim 1, wherein: the charge pump is a negative charge pump, the output voltage is a negative output voltage having a greater negative magnitude than the power supply voltage, and the gating transistor is a p-channel MOS gating transistor.

7. The integrated circuit of claim 1, wherein the charge pump section comprises four stages.

8. The integrated circuit of claim 1, wherein each stage of the charge pump section comprises a stage switch coupled to a respective clock signal through a stage capacitor, wherein the switch provides a stage output voltage at a stage output node having a higher average voltage magnitude than a stage input voltage magnitude received at a stage input node.

9. The integrated circuit of claim 8, wherein each said stage switch comprises a stage transistor coupled to a stage diode-connected transistor.

* * * * *